US011471794B2

(12) United States Patent
Schmitt et al.

(10) Patent No.: US 11,471,794 B2
(45) Date of Patent: Oct. 18, 2022

(54) FILTER CARTRIDGE FOR A WHOLE HOUSE WATER FILTERING SYSTEM

(71) Applicant: Watts Regulator Co., North Andover, MA (US)

(72) Inventors: Craig Schmitt, Peoria, AZ (US); Monica Preston, Glendale, AZ (US); Gilbert Ramirez, Phoenix, AZ (US)

(73) Assignee: Watts Regulator Co., North Andover, MA (US)

( * ) Notice: Subject to any disclaimer, the term of this patent is extended or adjusted under 35 U.S.C. 154(b) by 79 days.

(21) Appl. No.: 16/782,836

(22) Filed: Feb. 5, 2020

(65) Prior Publication Data

US 2020/0254365 A1    Aug. 13, 2020

Related U.S. Application Data

(60) Provisional application No. 62/804,051, filed on Feb. 11, 2019.

(51) Int. Cl.
*B01D 24/00* (2006.01)
*C02F 1/00* (2006.01)
*C02F 5/08* (2006.01)

(52) U.S. Cl.
CPC ........... *B01D 24/007* (2013.01); *C02F 1/003* (2013.01); *B01D 2101/02* (2013.01); *B01D 2201/302* (2013.01); *C02F 5/08* (2013.01)

(58) Field of Classification Search
CPC .... B01D 24/007; B01D 24/008; B01D 29/56; B01D 29/58

(Continued)

(56) References Cited

U.S. PATENT DOCUMENTS 163,814 A    5/1875   Sinclaire
171,056 A    12/1875  Sinclaire
(Continued)

FOREIGN PATENT DOCUMENTS

EP    3284526    2/2018
EP    3647274    5/2020
(Continued)

OTHER PUBLICATIONS

European Search Report for European Patent Application No. 20275036.0, dated Jun. 4, 2020, 12 pages.

(Continued)

*Primary Examiner* — Benjamin M Kurtz
(74) *Attorney, Agent, or Firm* — Day Pitney LLP; George N. Chaclas

(57) ABSTRACT

A filter cartridge for a whole house water filter includes a cylindrical, or tubular, filter media coupled to a mixer tank with improved high flow mixing features. The mixer tank includes a bowl in which a flow diverter, a flow guide with angled fins and a filter media are provided. The flow diverter has a concave portion, i.e., a mushroom-shaped portion, the interior of which is in fluid connection with a central passage through which filtered water flows. In operation, the filtered water flows through the central passage and is deflected by the concave interior of the flow diverter down through the angled fins of the flow guide. The filtered water then passes out through an outlet. The mixer tank stirs the filter media and water mix to increase the kinetics of the mixing process.

18 Claims, 10 Drawing Sheets

(58) Field of Classification Search
USPC .................................. 210/201–203, 285, 291
See application file for complete search history.

(56) References Cited

U.S. PATENT DOCUMENTS

| | | | |
|---|---|---|---|
| 2,027,400 A | 1/1936 | Pennebaker | |
| 3,174,623 A | 3/1965 | Sloan | |
| 3,746,171 A | 7/1973 | Thomsen | |
| 3,854,902 A | 12/1974 | Kalen | |
| 3,969,446 A | 7/1976 | Franklin, Jr. | |
| 4,693,823 A | 9/1987 | Matchett | |
| 4,919,849 A | 4/1990 | Litz et al. | |
| 4,989,636 A | 2/1991 | Hunter et al. | |
| 5,041,219 A | 8/1991 | Strand et al. | |
| 5,045,187 A | 9/1991 | Suchanek | |
| 5,076,918 A | 12/1991 | Foust et al. | |
| 5,141,637 A * | 8/1992 | Reed .................. | B01D 29/15 210/232 |
| 5,171,442 A | 12/1992 | Nakshbend, I | |
| 5,328,609 A | 7/1994 | Magnusson et al. | |
| 5,545,319 A | 8/1996 | Hart et al. | |
| 6,042,729 A | 3/2000 | Chau | |
| 6,090,285 A | 7/2000 | Chau | |
| 6,231,763 B1 | 5/2001 | Chau | |
| 6,402,944 B1 | 6/2002 | Vaughan | |
| 6,447,678 B2 | 9/2002 | Chau | |
| 7,186,338 B2 | 3/2007 | Boisvert | |
| 8,349,183 B2 | 1/2013 | Field | |
| 9,527,015 B2 | 12/2016 | Chau | |
| 9,815,725 B2 | 11/2017 | Rice | |
| 10,207,206 B2 | 2/2019 | Chau | |
| 2001/0008218 A1 | 7/2001 | Chau | |
| 2010/0170857 A1 | 7/2010 | Williams et al. | |
| 2011/0108489 A1 | 5/2011 | Fritze et al. | |
| 2013/0056402 A1 | 3/2013 | Chau | |
| 2014/0048469 A1* | 2/2014 | Wilder .................. | B01D 29/56 210/232 |
| 2014/0263054 A1 | 9/2014 | Julos et al. | |
| 2016/0016817 A1 | 1/2016 | Chau | |
| 2016/0096750 A1 | 4/2016 | Chau | |
| 2020/0353382 A1* | 11/2020 | Chau .................. | B01D 35/30 |

FOREIGN PATENT DOCUMENTS

| | | |
|---|---|---|
| JP | H09174050 | 8/1997 |
| WO | 01/26772 | 4/2001 |
| WO | 2006/031838 | 3/2006 |
| WO | 2013/063566 | 5/2013 |
| WO | 2014/004607 | 1/2014 |
| WO | 2014/053956 | 4/2014 |
| WO | WO2018223276 A1 | 12/2018 |
| WO | WO2019148415 A1 | 8/2019 |

OTHER PUBLICATIONS

European Search Report for European Patent Application No. 20275035.2 dated Jun. 2, 2020, 13 pages.
European Search Report for European Patent Application No. 20275037.8 dated Jun. 8, 2020, 8 pages.

* cited by examiner

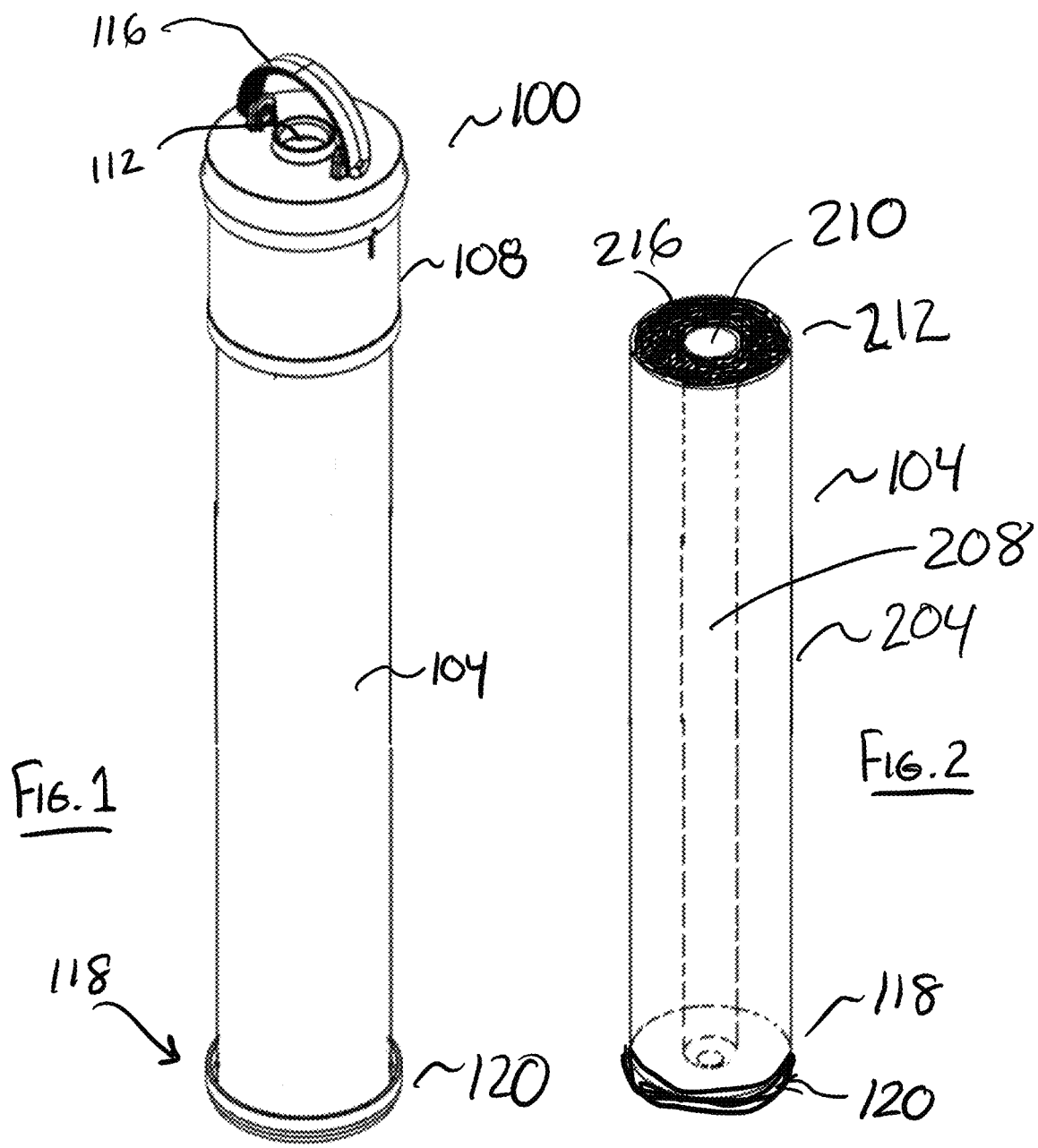

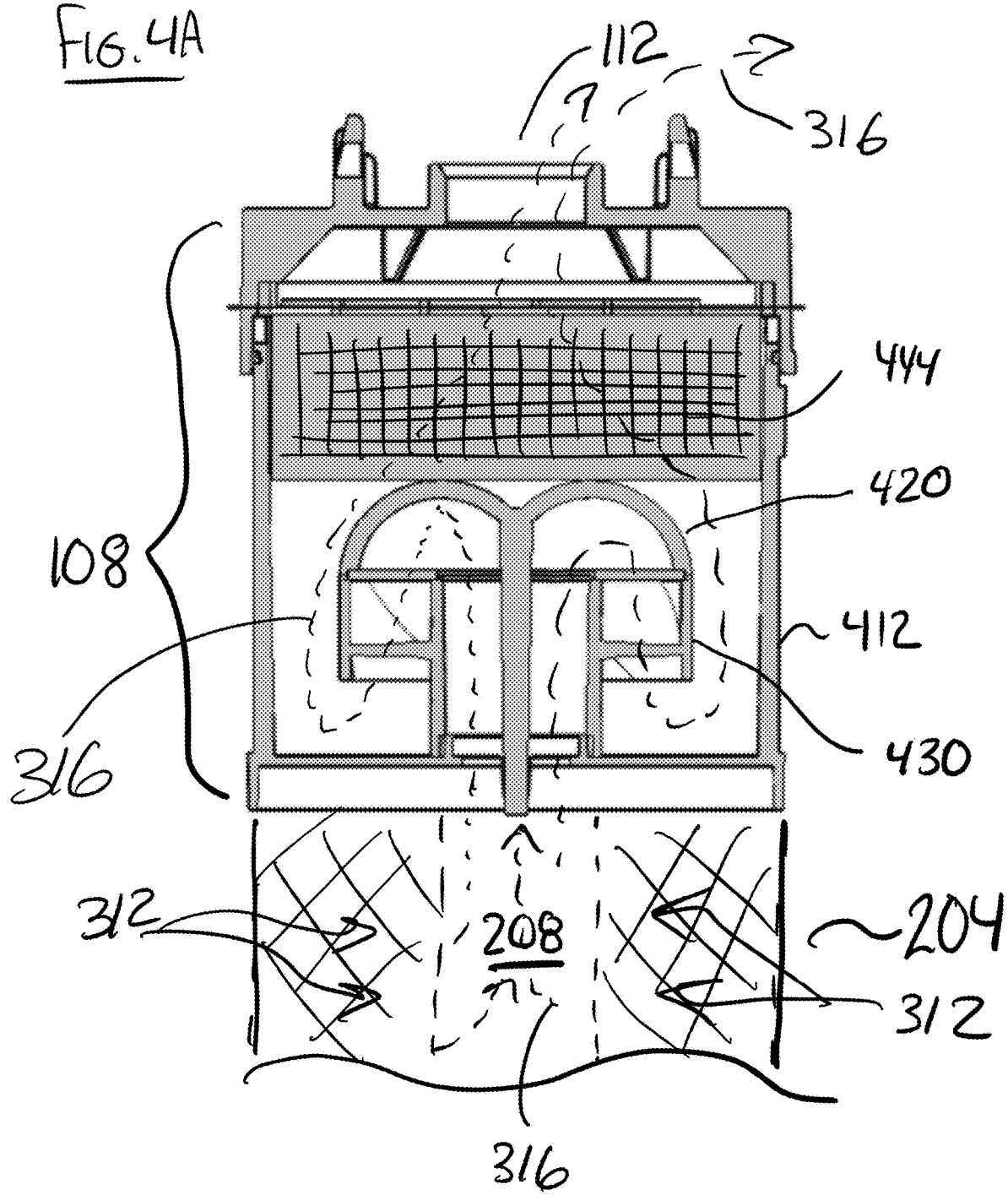

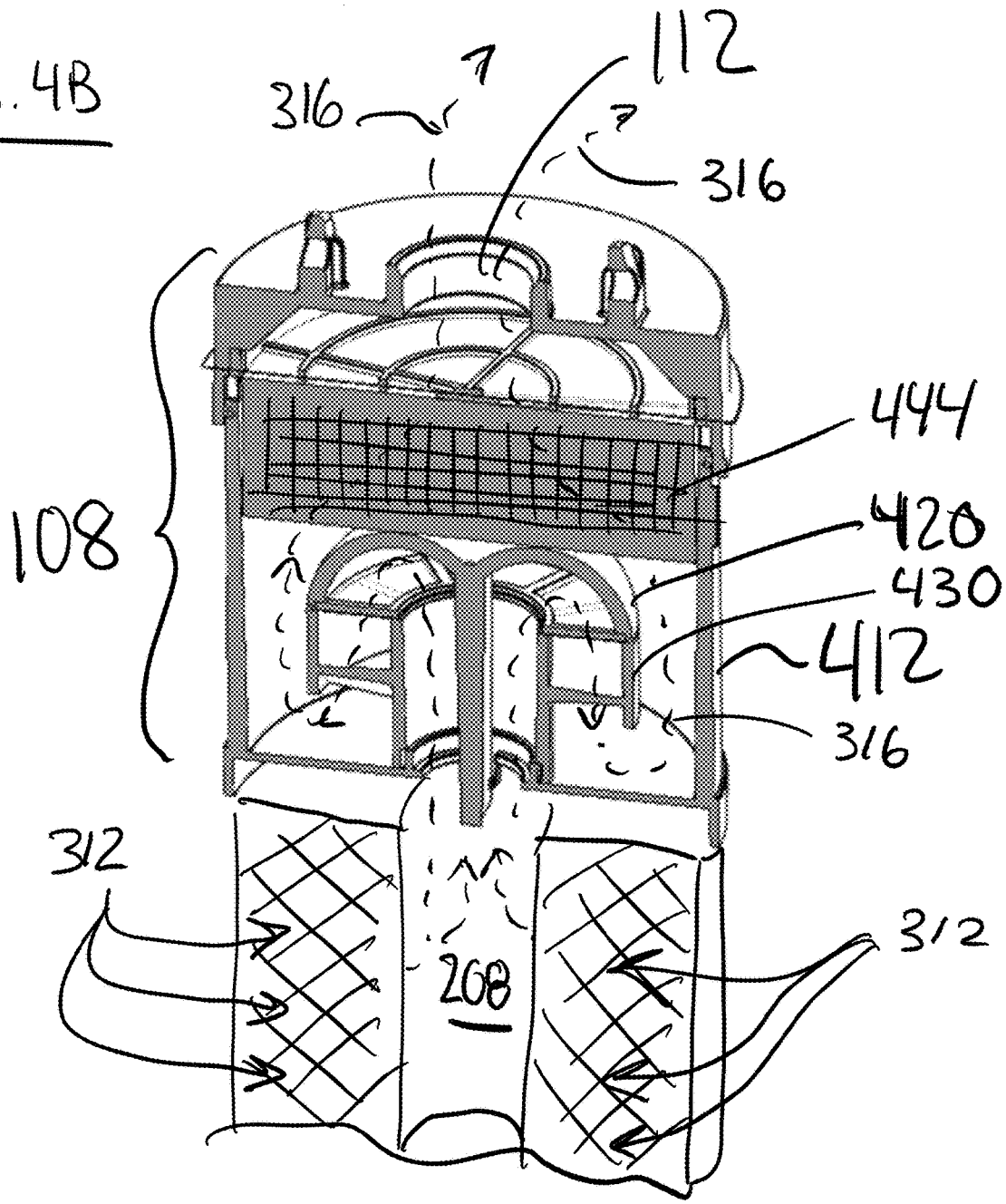

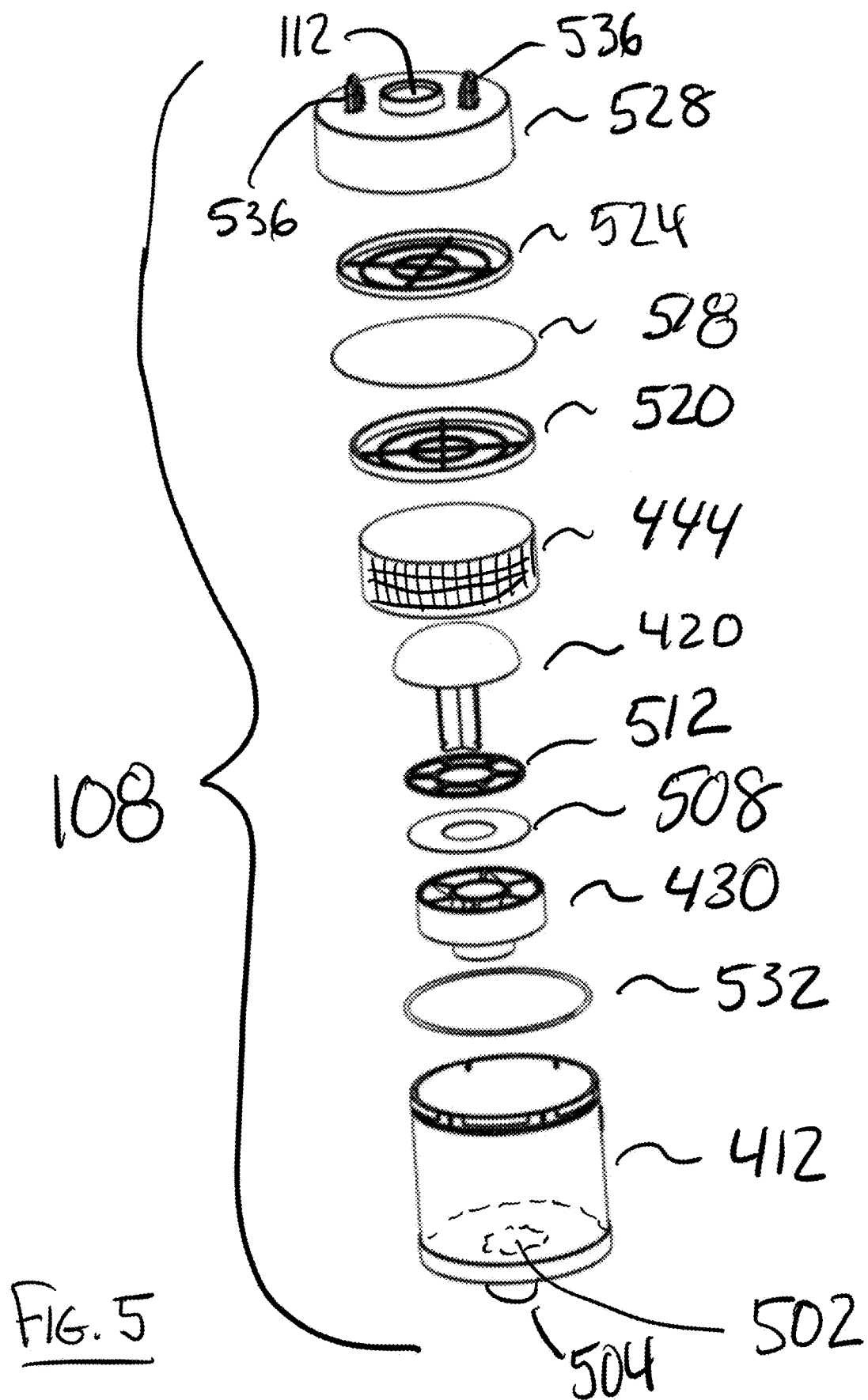

FILTER CARTRIDGE FOR A WHOLE HOUSE WATER FILTERING SYSTEM

CROSS-REFERENCE TO RELATED APPLICATIONS

This application claims priority to U.S. Provisional Application No. 62/804,051, entitled "Filtration System," filed on Feb. 11, 2019 which is hereby incorporated by reference in its entirety for all purposes.

This application is related to U.S. Non-Provisional application Ser. No. 16/544,026, entitled "Manifold Assembly for a Water Filter System," filed on Aug. 9, 2019, and to U.S. Non-Provisional Application Ser. No. 16/782,504 entitled "Pressure Relief Cover Assembly," filed on Feb. 5, 2020, each of which is hereby incorporated by reference in its entirety for all purposes.

FIELD OF THE SUBJECT TECHNOLOGY

The disclosure relates to a liquid filter cartridge. More particularly, the disclosure relates to a water filter cartridge for a whole house point of entry (POE) water filtering system.

BACKGROUND

A whole house water filter is a filtration system that is provided to filter the water that enters a house from an external water network, e.g., a public utility or a well. These systems are also called Point Of Entry (POE) systems because such filters are usually installed at a point before any unfiltered water enters the residence's water distribution system, i.e., the interior pipes. Accordingly, only filtered water reaches any points of use such as the water heater, faucets, showers, washing machines, etc. Therefore, every time water is used, filtered water flows. POE systems are designed to remove contaminants while accommodating various parameters such as water flow rate, filter selection to block different contaminants, filter longevity, reliability, ease of maintenance, etc. With proper selection and maintenance, a POE system improves the quality of the household water.

These filtration systems often have one or more vessels under pressure in which a filter cartridge is placed in order to provide a high filtered water flow to accommodate the water needs of the house. Known whole house water filters can be difficult to handle when being changed. What is needed, therefore, is an improved filter cartridge.

SUMMARY

In one aspect of the present disclosure there is a filter cartridge for a whole house water filtering system, comprising: a first filter having a first central passage defined therein; and a mixer tank coupled to the first filter such that an interior space of the mixer tank is fluidly coupled to the first central passage; a water conditioning media disposed in the mixer tank interior space. In addition, there is a flow guide, disposed in the mixer tank interior space, comprising: a central tube; a circular outer collar; and a plurality of angled blades extending from the central tube and coupled to the outer collar; and a flow diverter, coupled to the flow guide, comprising a dome portion having a concave interior surface and an outer periphery, wherein the flow guide central tube is aligned with the first central passage of the first filter.

The flow diverter further can comprise: a stalk extending from the concave interior surface, wherein the stalk is disposed in the flow guide central tube to couple the flow diverter thereto.

The mixer tank can further comprise: a cap, having an opening defined therein, coupled to the mixer tank to enclose the mixer tank interior; and an exit filter disposed in the mixer tank and positioned to cover the cap opening, wherein the exit filter is configured to prevent the water conditioning media from passing through the cap opening.

The filter cartridge can further comprise: a screen positioned in the interior space of the mixer tank to prevent the water conditioning media from entering into the flow guide central tube.

The filter cartridge can further comprise: a second filter, having a second central passage defined therein, removably coupled to the first filter, wherein the first and second central passages are fluidly coupled together.

In another aspect of the present disclosure there is a whole house water filtering system, comprising: a pressure vessel; and a filter cartridge, disposed within the pressure vessel. The filter cartridge comprises: a first filter having a first central passage defined therein; a mixer tank, coupled to the first filter such that an interior space of the mixer tank is fluidly coupled to the first central passage; a water conditioning media disposed in the mixer tank interior space; and a flow guide, disposed in the mixer tank interior space, comprising: a central tube; a circular outer collar; and a plurality of angled blades extending from the central tube and coupled to the outer collar; and a flow diverter, coupled to the flow guide, comprising: a dome portion having a concave interior surface and an outer periphery, wherein the flow guide central tube is aligned with the first central passage of the first filter.

In yet another aspect of the present disclosure there is a filter cartridge for a whole house water filtering system, comprising: a first filter having a first central passage defined therein; a mixer tank coupled to the first filter such that an interior space of the mixer tank is fluidly coupled to the first central passage; a water conditioning media disposed in the interior space of the mixer tank; and a mixing structure, disposed in the interior space of the mixer tank. The mixing structure comprising: a dome portion, having a concave interior surface and an outer periphery; and a circular outer collar, coupled to the dome portion, comprising a central tube and a plurality of angled blades extending from the central tube to the outer collar, wherein the central tube is aligned with the first central passage of the first filter. It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

Various aspects of the present disclosure are discussed below with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The Figures are provided for the purposes of illustration and explanation and are not intended as a definition of the limits of the disclosure. In the Figures:

FIG. 1 is a perspective view of a filter cartridge in accordance with an aspect of the present disclosure;

FIG. 2 is a perspective view of a filter media in accordance with an aspect of the present disclosure;

FIG. 4A is a cross-sectional view of a mixer tank of the filter cartridge of FIG. 1;

FIG. 4B is a perspective view of the mixer tank of the filter cartridge of FIG. 1;

FIG. 5 is an exploded view of the mixer tank of FIG. 4A and FIG. 4B;

DETAILED DESCRIPTION

Figure 3:
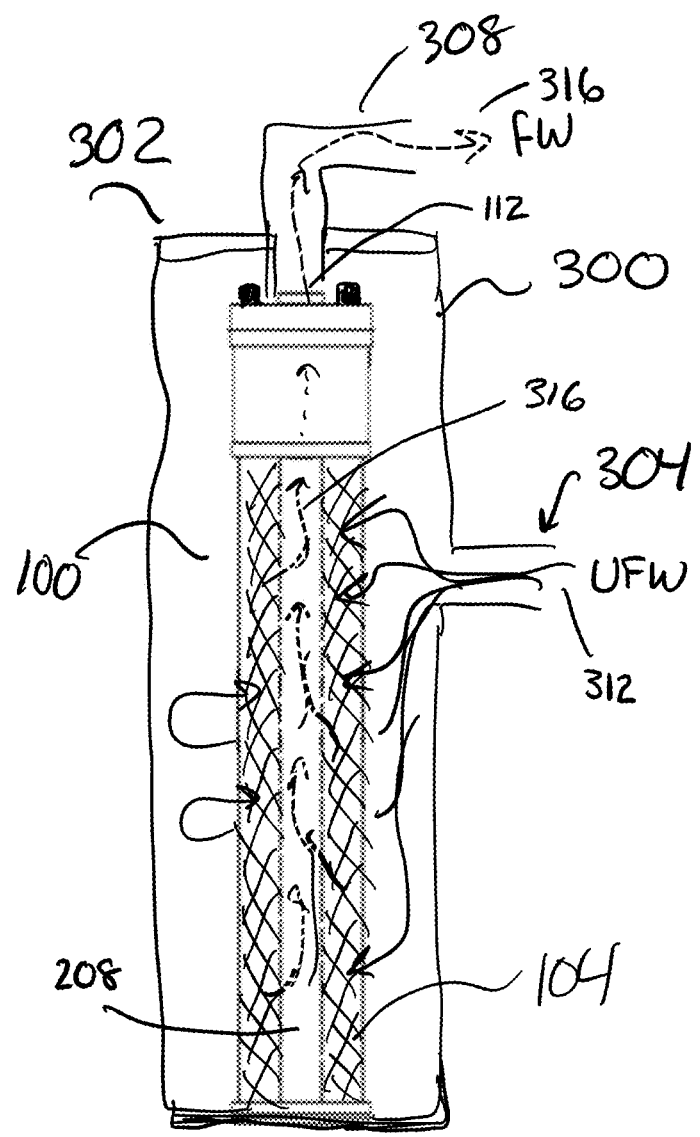
FIG. 3 is a view of the filter cartridge of FIG. 1 placed in a pressure vessel.

This application claims priority to U.S. Provisional application No. 62/804,051, entitled "Filtration System," filed on Feb. 11, 2019 which is hereby incorporated by reference in its entirety for all purposes.

This application is related to U.S. Non-Provisional Application Ser. No. 16/544,026, entitled "Manifold Assembly for a Water Filter System," filed on Aug. 9, 2019, and to U.S. Non-Provisional Application Ser. No. 16/782,504 entitled "Pressure Relief Cover Assembly," filed on Feb. 5, 2020, each of which is hereby incorporated by reference in its entirety for all purposes.

In the following detailed description, numerous specific details are set forth in order to provide a thorough understanding of the embodiments of the present disclosure. It will be understood by those of ordinary skill in the art that these embodiments may be practiced without some of these specific details. In other instances, well-known methods, procedures, components and structures may not have been described in detail so as not to obscure the described embodiments.

Prior to describing at least one embodiment of the present disclosure in detail, it is to be understood that these are not limited in their application to the details of construction and the arrangement of the components set forth in the following description or illustrated in the drawings. Also, it is to be understood that the phraseology and terminology employed herein are for the purpose of description only and should not be regarded as limiting. It should be noted that direction indications used herein such as, for example, but not limited to, above, below, upward, downward, right, left, top, bottom and the like, are used with respect to the figures and not meant in a limiting manner.

At the core of a whole house water filter, in accordance with an aspect of the present disclosure, is a filter cartridge 100, as shown in FIG. 1. The filter cartridge 100 includes a cylindrical, or tubular, filter media 104, for example, but not limited to, a carbon block, coupled to a mixer tank 108, the details of which will be described in more detail below. The mixer tank 108 includes an outlet port 112 and, optionally, a handle 116. A distal end 118 of the filter media 104 is provided with a bottom cap 120. The filter media 104 and the mixer tank 108 are mechanically coupled to one another such that the filter cartridge 100 can be maneuvered by holding the handle 116. As will be described below, the filter cartridge 100 includes improved mixing features.

As shown in FIG. 2, the filter media 104 includes a body 204 comprising a structure for filtering contaminants from a liquid, e.g., water. A central passage 208 is defined in the body 204 with an opening 210 defined at a proximal end 212. A cap 216 is provided on the proximal end 212 with an opening corresponding to the central passage 208. As will be described in more detail below, unfiltered liquid passes through the body 204 and filtered liquid flows into the central passage 208 and out the opening 210. It should be noted that the central passage 208 is closed off by the bottom cap 120.

In one aspect of the present disclosure, the filter cartridge 100 is placed in a pressure vessel 300 as shown in FIG. 3. The pressure vessel 300 can be cylindrical or have any other appropriate geometry. It should be noted that specific mechanical details of the pressure vessel 300, for example, a manifold assembly or a pressure relief cover, are not described herein as they are not relevant to the operation of the filter cartridge 100 within the vessel 300. Such vessel components are described, however, in U.S. Provisional Application No. 62/804,051, and U.S. Non-Provisional Application Ser. No. 16/544,026, and U.S. Non-Provisional Application Ser. No. 16/782,504. The pressure vessel 300 can include a cover 302 that can either be removably connected or connected by a hinge to the vessel 300. The filter cartridge 100 is adapted to be inserted into and removed from the pressure vessel 300 when the cover 302 is opened. The pressure vessel 300 can be made of any one of a number of materials, or combinations thereof, e.g., fiber glass, metal or any plastic.

An inlet 304 is provided in the vessel 300 and is in fluid connection with an interior space of the vessel 300. An outlet 308 is in fluid connection with the mixer tank outlet port 112 and is sealed off from the interior of the vessel 300. Unfiltered water 312, represented by solid-line arrows, enters through the inlet port 304 and passes through the structure of the filter media 104 and filtered water 316, represented by dotted-line arrows, enters into the central passage 208. As will be discussed in more detail below, the central passage 208 is fluidly coupled to the outlet port 308, via the mixer tank 108, to provide filtered water 316 to, for example, the house. Only filtered water 316 enters into the central passage 208 and the mixer tank 108 as they are, otherwise, sealed off from the interior of the vessel 300.

In accordance with aspects of the present disclosure, the mixer tank 108 provides a high flow media mixing apparatus. Referring now to FIG. 4A and FIG. 4B, the mixer tank 108 includes a bowl 412 in which a flow diverter 420, a flow guide 430 and a water conditioning media 444 are provided. The flow diverter 420 has a concave portion, i.e., a mushroom-shaped portion, the interior of which is in fluid connection with the central passage 208.

According to one exemplary embodiment, the water conditioning media 444 comprises OneFlow® salt-free scale prevention media, http://thescalesolution.com/, available from Watts Water Technologies, Inc. This water conditioning media 444 is also described in U.S. Pat. No. 9,879,120, which is incorporated by reference herein for all purposes. Accordingly, the tubular or disk shape of element 444 in the Figures is merely representative as the water conditioning media 444 is loose granular material, generally in the form of beads, contained within the bowl 412. When there is no water flow, the water conditioning media 444 falls to/rests at a bottom of the bowl 412. During flow, as will be discussed below, the water conditioning media 444 is dispersed in the liquid.

Accordingly, in operation, the filtered water 316 flows through the central passage 208 and is deflected by the concave interior surface of the flow diverter 420 down through the flow guide 430. The filtered water 316 then passes out through the outlet 112 with the water conditioning media 444 being prevented from leaving the tank per components described below.

Advantageously, the structure of the mixer tank 108 is placed on top of the filter media 104 and only one pressure vessel 300 is then required, thereby alleviating the need for a second pressure vessel. The mixer tank 108 stirs the water conditioning media 444 and water mix to increase the efficiency of the water conditioning process. In addition, high and low flow areas are created on the exit portion allowing the water conditioning media 444 to settle in one area and then be remixed in a turbulent mixing pattern to reduce clogging of an exit screen.

The mixer tank 108 includes a number of other components, in addition to the bowl 412, the flow diverter 420, the flow guide 430 and the water conditioning media 444, as presented in FIG. 5. As shown, the mixer tank 108 includes the bowl 412 defining an interior space with an open top and a substantially enclosed bottom forming a central hole 502 with a flange 504 provided around the central hole 502. The flange 504 may extend above and below the bottom, being sized and configured to insert into the central passage 208.

A screen 508 is positioned between the flow guide 430 and the flow diverter 420 in order to prevent any backflow of the water conditioning media 444 into the central passage 208. The screen 508 can be additionally held in place by a wagon wheel structure 512. A mesh exit screen 518 is positioned. In one embodiment, the mesh exit screen 518 is held between a lower mesh holder 520 and an upper mesh holder insert 524.

A cap 528 couples to the bowl 412 for enclosing the components in the interior of the bowl 412. An O-ring 532 seals the connection between the cap 528 and the bowl 412. The cap 528 has a top portion defining the exit port 112 for water passing through the mesh exit screen 518 without allowing the water conditioning media 444 to escape. The cap 528 can also include handle mounts 536 that couple to the handle 116 for carrying the filter cartridge when, for example, inserting or removing the filter cartridge 100 into or from the pressure vessel 300.

Figure 6A:
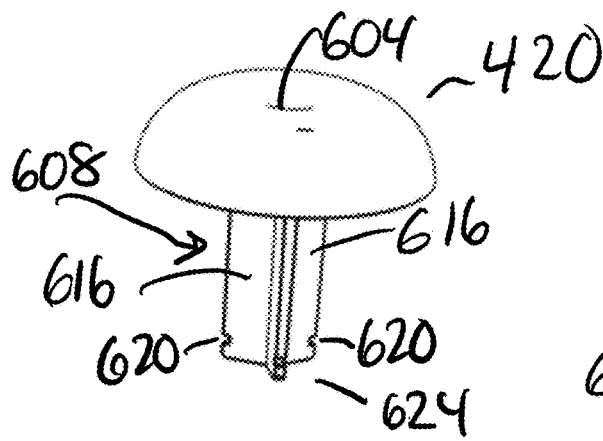
FIG. 6A is a first perspective view of a flow diverter of the filter cartridge of FIG. 1.
Figure 6B:
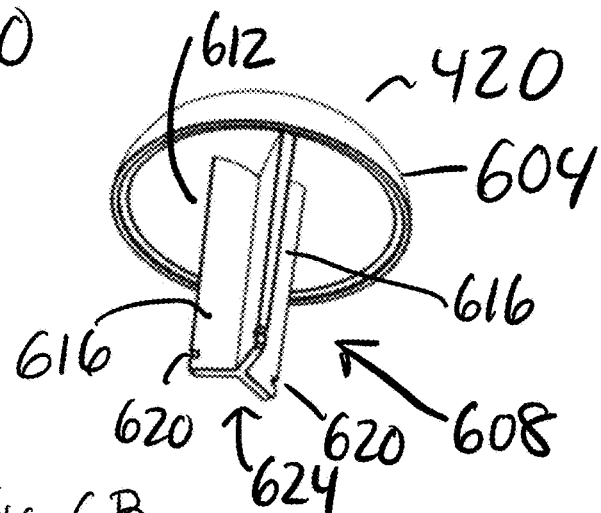
FIG. 6B is a second perspective view of the flow diverter of FIG. 6A.

The flow diverter 420 includes a concave dome portion 604 having a stalk 608 extending from an interior surface 612, as shown in FIGS. 6A and 6B. The stalk 608 is configured to couple to the flange 504. In one embodiment, the stalk 608 can comprise a plurality of ribs 616 where, for example, but not meant to be limiting, three ribs 616 are shown. Each rib 616 can comprise a distal groove 620 positioned at a distal end 624. When assembled, the grooves 620 interact with notches (not shown) in the bowl 412 to secure the flow diverter 420 in place. The stalk 608 may be a separate component that is coupled to the interior surface 612 of the concave dome portion 604 or the concave dome portion 604 and the stalk 608 may be a unitary piece manufactured, for example, by an additive manufacturing process or other process as is known to those of ordinary skill in the art.

Figure 7A:
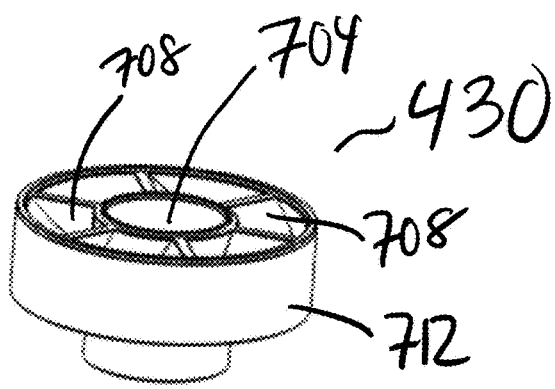
FIG. 7A is a first perspective view of a flow guide of the filter cartridge of FIG. 1.
Figure 7B:
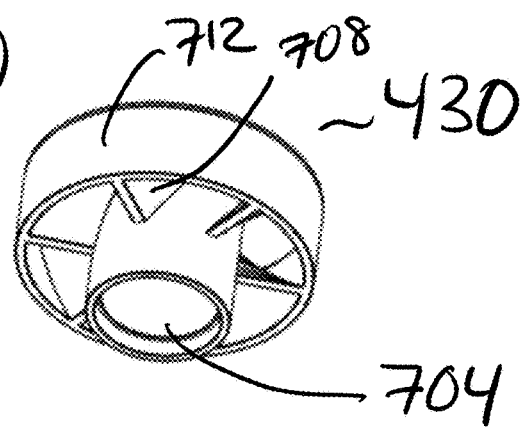
FIG. 7B is a second perspective view of the flow guide of FIG. 7A.

Referring now to FIGS. 7A and 7B, the flow guide 430 has a central tube 704 configured to receive the stalk 608. A plurality of angled blades 708 extend from the central tube 704 to a circular outer collar 712 so that as the reversed flow passes downward through the outer collar 712, the angled blades 708 create a circular pattern inside the mixer tank 108 to mix the water conditioning media 444 with the water.

Figure 8:
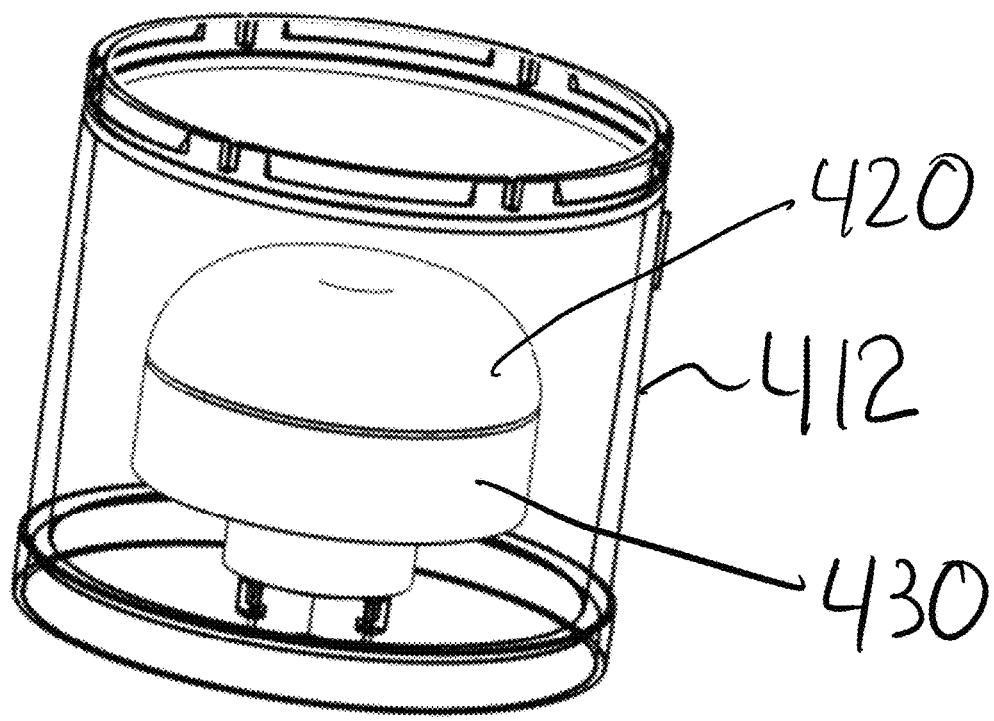
FIG. 8 is a perspective, cut-away view of the mixer tank, flow diverter and flow guide.

The combination of the flow diverter 420 and the flow guide 430 positioned in the mixer 108 is presented in FIG. 8. As is shown in FIG. 8 and in FIGS. 4A and 4b, the flow guide 430 and the flow diverter 420 have a same outer diameter periphery and the flow diverter 420 covers the flow guide 430. It should also be noted that while the combination of the flow diverter 420 and the flow guide 430 is shown as two separate pieces a single structure, i.e., a unitary structure, can also be implemented. Such a unitary structure can include the concave surface and the blades between the central tube and the outer collar and can also be made using additive manufacturing concepts, i.e., 3-D printing.

In operation, as generally discussed above, the filtered water 316 flows up into the mixer tank 108 higher than the filter media 104. As the filtered water 316 enters the mixer tank 108 moving upwards, i.e., away from the filter 204, the filtered water 316 is redirected by the underside 612 of the dome 604. When moving downward, as redirected, the filtered water 316 passes through the angled flow blades 708 of the flow guide 430 to direct the filtered water 316 in a circular pattern around the inside of the bowl 412. As a result, any water conditioning media 444 at the bottom of the bowl 412 is mixed with the swirling filtered water 316. That is, as the water conditioning media 444 in the bowl is a loose granular media, it will sit at the bottom of the bowl until mixed with flowing water. The filtered water 316 is also forced upward and around the mushroom-shaped flow diverter 420 with the water conditioning media 444 mixing into the filtered water 316. The filtered water 316 passes through the mesh exit screen 518 but the water conditioning media 444 is not passed through. The center of the exit screen 518 allows the water conditioning media 444 to settle back downward and recycle through the flowing filtered water 316.

The flow within the mixer tank 108 is analogous to the spinning motion of a hurricane. This flow comes up the flow diverter 420 and curves down into the flow guide 430 and the fins 708 introduce a rotation. The water conditioning media 444 is then rotating upwards in the bowl along the outer diameter. The water conditioning media 444 is then blocked by the mesh exit screen 518 so it curves and flows down the center of the mixer tank 108. Accordingly, a central low pressure exit area also provides a relief area for more water to flow through as the flow rate increases.

Figures 9A, 9B:
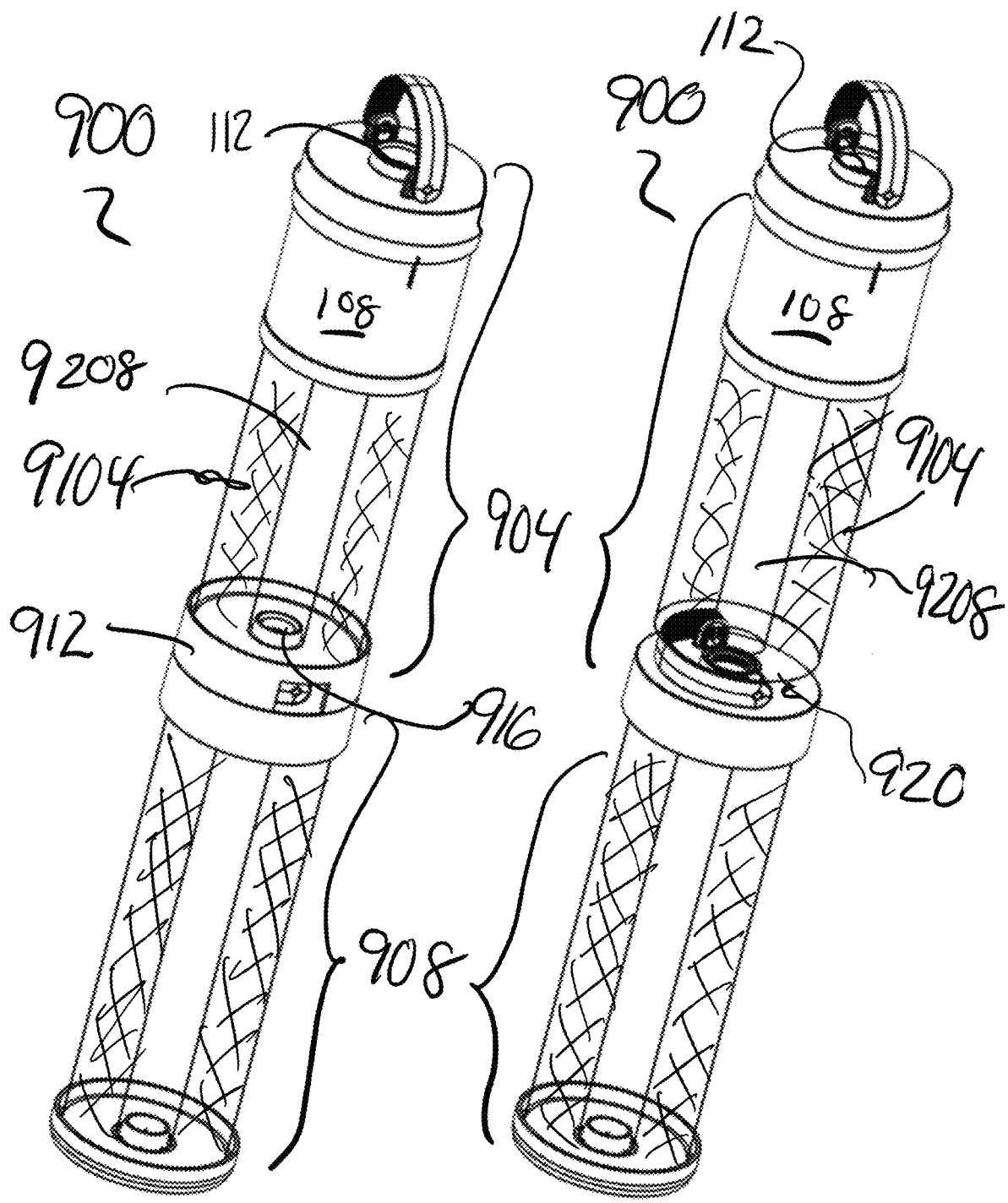
FIGS. 9A and 9B present a filter cartridge in accordance with an aspect of the present disclosure.
Figure 10:
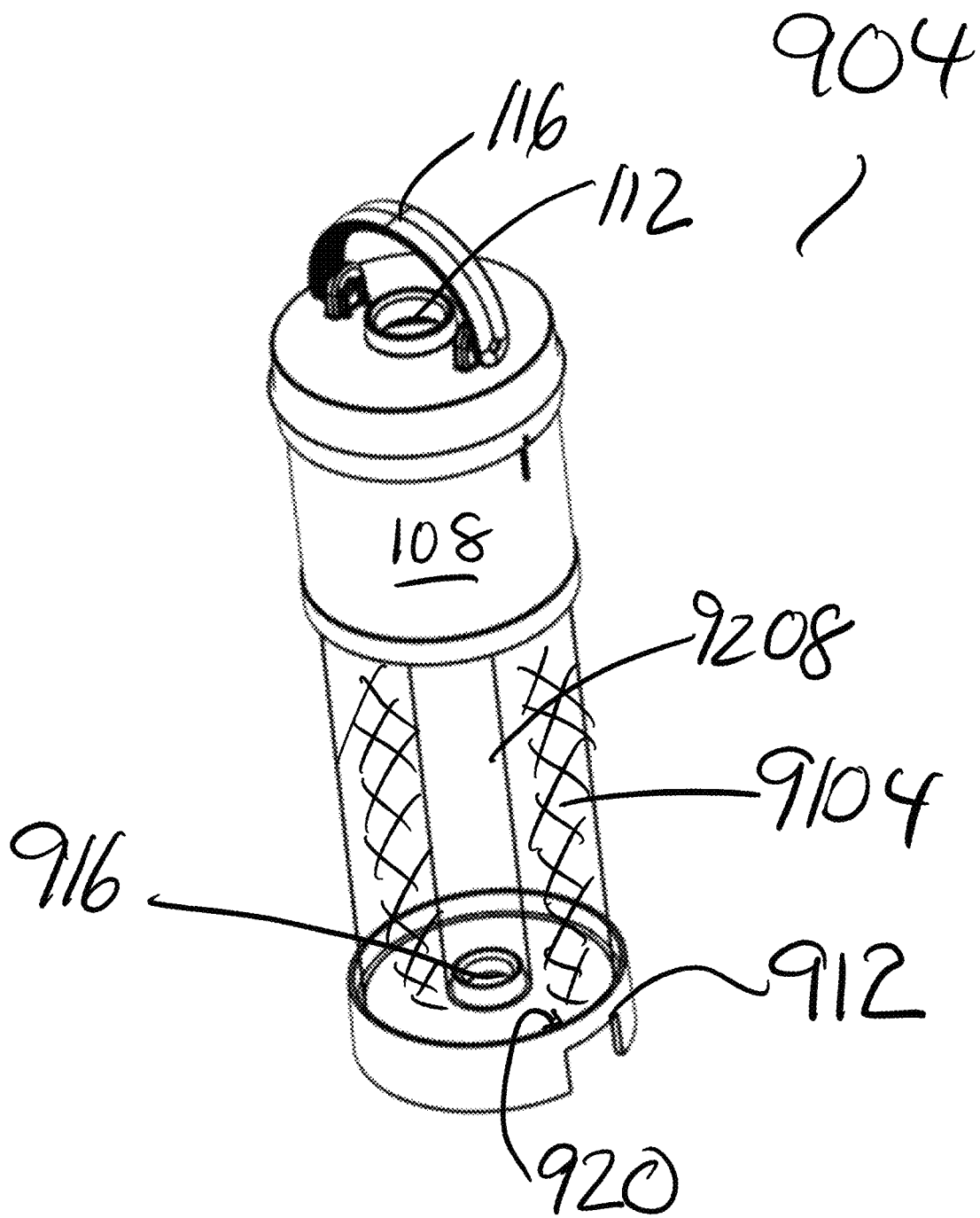
FIG. 10 is a perspective view of a portion of the filter cartridge of FIGS. 9A and 9B.
Figure 11:
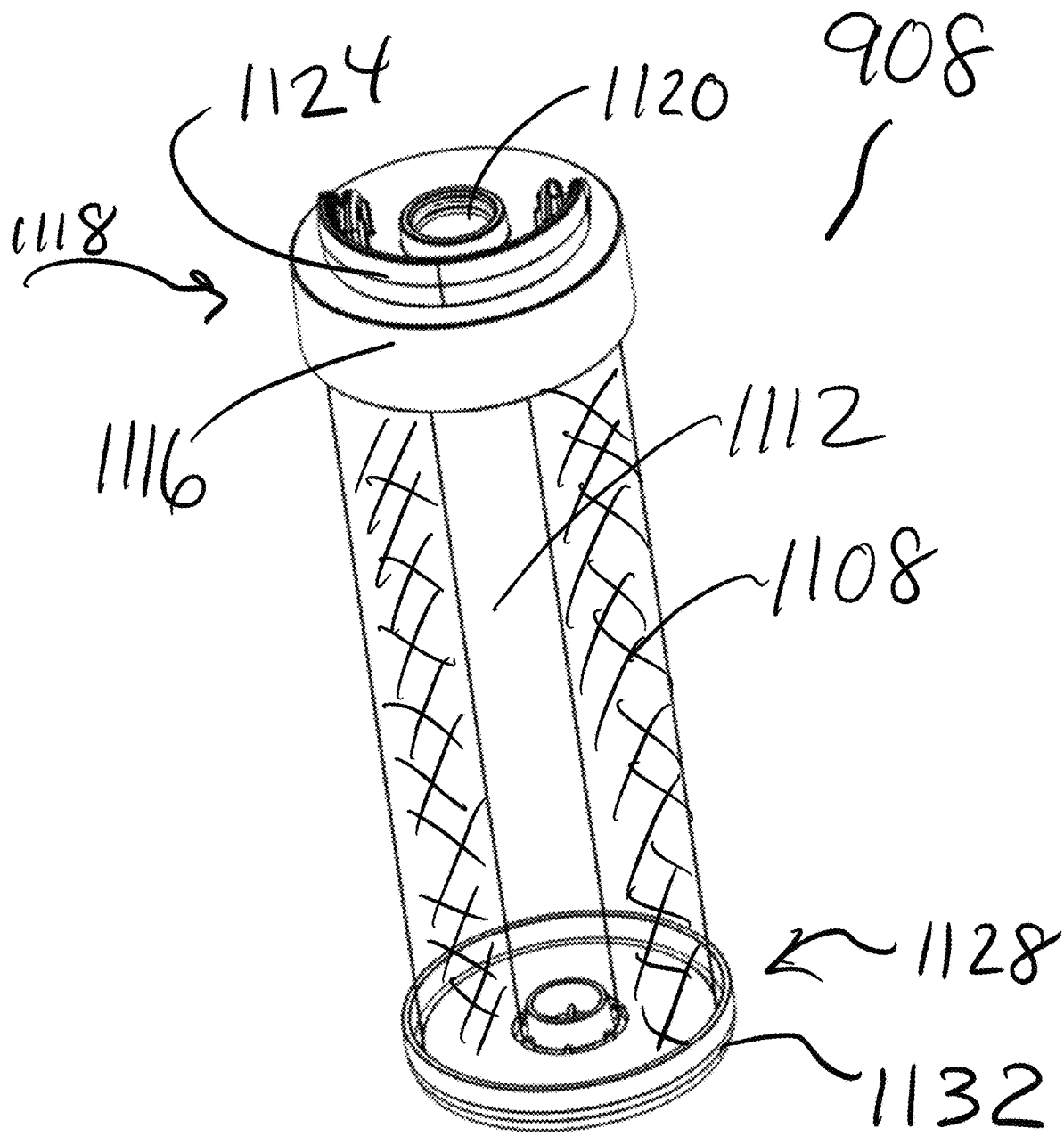
FIG. 11 is a perspective view of another portion of the filter cartridge of FIGS. 9A and 9B.

A filter cartridge 900, in accordance with another aspect of the present disclosure, is depicted in FIGS. 9A and 9B. The filter cartridge 900 includes a top filter portion 904 and a bottom filter portion 908 that are configured to be coupled to one another. Advantageously, the filter cartridge 900 can be disassembled into the two portions 904, 908 for easy storage and/or shipping in, for example, a standard box or container. It should be noted that the references to "top" and "bottom" are merely labels with respect to the figures.

The top filter portion 904 is similar to the filter cartridge 100 in that the top filter portion 904 includes a cylindrical, or tubular, filter media 9104, in which is defined a central passage 9208, coupled to a mixer tank 108, an outlet port 112 and a handle 116, similarly to that which is described above. A handle space cap 912 is coupled to the bottom of the top filter portion 904, as shown in FIG. 9A but not shown in FIG. 9B, for clarity.

In other words, water enters and flow upward. As the water enters the mixer tank 108, the fins 708 cause the water to swirl and move upward around the concave dome 604. The water passes through the mesh exit screen 518. The outer edges of the exit screen 518 build up the water conditioning media 444 because that is the shortest path to exit. The center of the exit screen 518 allows the water conditioning media 444 to settle back downward and recycle through the water flow. The central low pressure exit area also provides a relief area for more water to flow. As a result, the swirling pattern of the water creates good turbulent mixing with a desirable perimeter high pressure area and a central low pressure area on the exit screen 518.

The bottom filter portion 908 includes a cylindrical, or tubular, filter media 1108 in which is defined a central passage 1112. A bottom filter cap 1116 is provided at a proximal end 1118 of the filter media 1108 and includes an outlet port 1120 and a handle 1124. A distal end 1128 of the filter media 1108 is provided with a bottom cap 1132. The filter media 1108 functions similarly to that which is described above.

The handle space cap 912 also defines a central aperture 916 for fluid flow and a space 920 for the handle 1104 when coupled to the bottom filter portion 908. Accordingly, the bottom filter cap 1116 and the handle space 912 can be secured together by threads, snap-fit, friction fit, etc., to fluidly couple the central aperture 916 to the opening 1120. Once connected the two filter portions 904, 908 function effectively as a single filter, similar to the filter cartridge 100.

In addition, the top filter portion 904 and the bottom filter portion 908 need not be the same length nor have respective filter media 9104, 1108 of the same length.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular embodiments, the present disclosure is not intended to be limited to the particulars disclosed herein; rather, the present disclosure extends to all functionally equivalent structures, methods and uses, such as are within the scope of the claims.

What is claimed is:

1. A filter cartridge for a whole house water filtering system, comprising:
    a filter having a central passage defined therein;
    a mixer tank coupled to the filter such that an interior space of the mixer tank is fluidly coupled to the central passage;
    a water conditioning media disposed in the mixer tank interior space;
    a flow guide disposed in the mixer tank interior space, comprising:
        a plurality of angled blades to create a circular flow pattern inside the mixer tank; and
        a central tube; and
    a flow diverter coupled to the flow guide comprising:
        a dome portion having a concave interior surface; and
        a stalk extending from the concave interior surface, the stalk disposed in the central tube to couple the flow diverter thereto,
    wherein the central tube is aligned with the central passage of the filter.

2. The filter cartridge as recited in claim 1, wherein the stalk comprises:
    a plurality of ribs,
    wherein each rib is configured to fit within the central tube.

3. The filter cartridge as recited in claim 1, wherein the flow guide further comprises a circular outer collar, wherein the plurality of angled blades extend from the central tube and are coupled to the outer collar.

4. The filter cartridge as recited in claim 3, wherein the plurality of angled blades are equidistantly disposed about a circumference of the outer collar.

5. The filter cartridge as recited in claim 1, wherein the mixer tank further comprises:
    a cap, having an opening defined therein, coupled to the mixer tank to enclose the mixer tank interior; and
    an exit filter disposed in the mixer tank and positioned to cover the cap opening, wherein the exit filter is configured to prevent the water conditioning media from passing through the cap opening.

6. The filter cartridge as recited in claim 5, wherein the exit filter comprises a mesh screen.

7. The filter cartridge as recited in claim 1, further comprising:
    a screen positioned in the interior space of the mixer tank to prevent the water conditioning media from entering into the flow guide central tube.

8. The filter cartridge as recited in claim 1, wherein the filter includes a top half and a bottom half configured to assemble via a filter cap disposed on a portion of the bottom half.

9. The filter cartridge as recited in claim 8, wherein the filter cap includes a central flange defining a central aperture forming a portion of the central passage.

10. A whole house water filtering system, comprising:
    a pressure vessel; and
    a filter cartridge as recited in claim 1 disposed within the pressure vessel.

11. A filter cartridge for a whole house water filtering system, comprising:
    a filter defining a central passage along an axis for egress of filtered fluid;
    a mixer tank coupled to the filter such that an interior space of the mixer tank receives the filtered fluid from the central passage of the filter, wherein the mixer tank has a bottom portion;

a loose granular filter media in the bottom portion;

a flow diverter disposed above the bottom portion in the interior space of the mixer tank, the flow diverter having a concave portion configured to guide the filtered fluid in a direction opposite the direction of filtered fluid entering the flow diverter along the axis to the bottom portion to mix with the loose granular filter media in the interior space of the mixer tank; and a flow guide disposed between the flow diverter and the interior space of the mixer tank, wherein the flow diverter further comprises a stalk disposed in the flow guide and extending from the concave portion to couple the flow diverter thereto.

12. The filter cartridge as recited in claim 11, wherein the flow guide includes a plurality of angled blades configured to direct flow in a circular pattern in at least a portion of the interior space of the mixer tank.

13. The filter cartridge as recited in claim 12, further comprising:

a mesh exit screen disposed adjacent to an exit port of the mixer tank, wherein flow is directed through the central passage of the filter and thereafter redirected by the concave portion of the flow diverter, wherein the angled blades of the flow guide direct the flow in a circular pattern around the interior space of the mixer tank such that the loose granular filter media is mixed with the flow, wherein the flow thereafter passes through the mesh exit screen, wherein the mesh exit screen excludes the loose granular filter media from passing through.

14. The filter cartridge as recited in claim 11, further comprising a mesh exit screen disposed adjacent to an exit port of the mixer tank and the concave portion directs the loose granular filter media radially outward during settling.

15. A filter cartridge for a whole house water filtering system, comprising:

an elongated filter defining a central passage along an axis for egress of filtered flow;

a mixer tank having a bottom with an upstanding sidewall defining an interior space, the bottom defining a central hole aligned with the central passage;

a flow guide having: a central tube mounted in the central hole and fluidly coupled to the central passage for receiving the filtered flow; a collar surrounding the central tube; and a plurality of blades angled with respect to the axis and extending between the central tube and collar;

a loose granular filter media disposed in the interior space;

a flow diverter having a concave dome portion mounted above the central tube in the interior space to redirect the filtered flow passing through the central tube through the plurality of angled blades to create a swirling filtered flow in the bottom of the mixer tank to mix the filtered flow with the loose granular filter media;

a cap enclosing the interior of the mixer tank and defining an exit port for egress of the filtered flow forced upward and around the concave dome portion; and an exit screen axially spaced between the concave dome portion and the exit port and the exit screen is axially spaced from the concave dome portion, wherein a central low pressure exit area and a radially outward high exit pressure area are created on the exit screen allowing the loose granular media to settle back into the bottom of the mixing tank to reduce clogging of the exit screen.

16. The filter cartridge of claim 15, wherein: the concave dome portion is rounded; and the loose granular media is directed radially outward by the concave rounded dome portion during settling.

17. The filter cartridge of claim 16, wherein the central low pressure exit area has a higher flow rate than the radially outward high exit pressure area.

18. The filter cartridge of claim 15, wherein the mesh exit screen is circular in shape.

* * * * *